(12) United States Patent
Guo

(10) Patent No.: US 8,164,677 B2
(45) Date of Patent: Apr. 24, 2012

(54) LENS MODULE WITH GAS PRESSURE CONTROL DEVICE AND CAMERA MODULE HAVING SAME

(75) Inventor: Ming-Lung Guo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 545 days.

(21) Appl. No.: 12/466,358

(22) Filed: May 14, 2009

(65) Prior Publication Data

US 2009/0303376 A1 Dec. 10, 2009

(30) Foreign Application Priority Data

Jun. 5, 2008 (CN) .......................... 2008 1 0302042

(51) Int. Cl.
*H04N 5/225* (2006.01)
(52) U.S. Cl. ...................................................... 348/340
(58) Field of Classification Search .................. 348/340, 348/373, 374, 375, 207.99, 360
See application file for complete search history.

(56) References Cited

U.S. PATENT DOCUMENTS

| | | | | |
|---|---|---|---|---|
| 7,639,936 | B2 * | 12/2009 | Lin | 396/87 |
| 7,697,056 | B2 * | 4/2010 | Huang | 348/340 |
| 7,697,061 | B2 * | 4/2010 | Chang | 348/369 |

FOREIGN PATENT DOCUMENTS

JP 2002-102149 A 4/2002

* cited by examiner

*Primary Examiner* — Hung Dang
(74) *Attorney, Agent, or Firm* — Altis Law Group, Inc.

(57) ABSTRACT

An exemplary lens module includes a barrel, a first lens fixedly disposed in the barrel, a second lens movably received in the barrel, and a pressure control device. The barrel includes a peripheral side wall. A hole is defined in the peripheral side wall. The first lens, the second lens, and the barrel together define a chamber. The chamber communicates with the hole. The pressure control device communicates with the hole so as to change the gas pressure of the chamber, thereby moving the second lens relative to the first lens.

14 Claims, 4 Drawing Sheets

LENS MODULE WITH GAS PRESSURE CONTROL DEVICE AND CAMERA MODULE HAVING SAME

BACKGROUND

1. Technical Field

The present disclosure relates to optical imaging and, particularly, to a lens module having gas pressure control in order to adjust a position of a lens, and a camera module having the lens module.

2. Description of Related Art

With the ongoing development of optical imaging technology, camera modules are now widely used in a variety of electronic devices, such as mobile phones and personal digital assistants (PDAs).

In a typical camera module, an actuator is employed to drive a lens (or a lens assembly) to move relative to either an image sensor or another lens (or another lens assembly), in order to achieve auto-focusing or zooming. The actuator commonly includes a stepper motor and drive circuitry. The drive circuitry, regulated by a control unit, can drive the stepper motor to perform rotational movement. In order to adjust the position of the lens, a gear assembly is employed to transform the rotational movement of the stepper motor into linear movement. However, it is difficult to produce the camera module with the stepper motor and the gear assembly; and the stepper motor and the gear assembly may make the camera module large and heavy.

Therefore, a lens module and a camera module which can overcome the above mentioned problems are desired.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Various embodiments will now be described in detail below with reference to the drawings.

Figure 1:
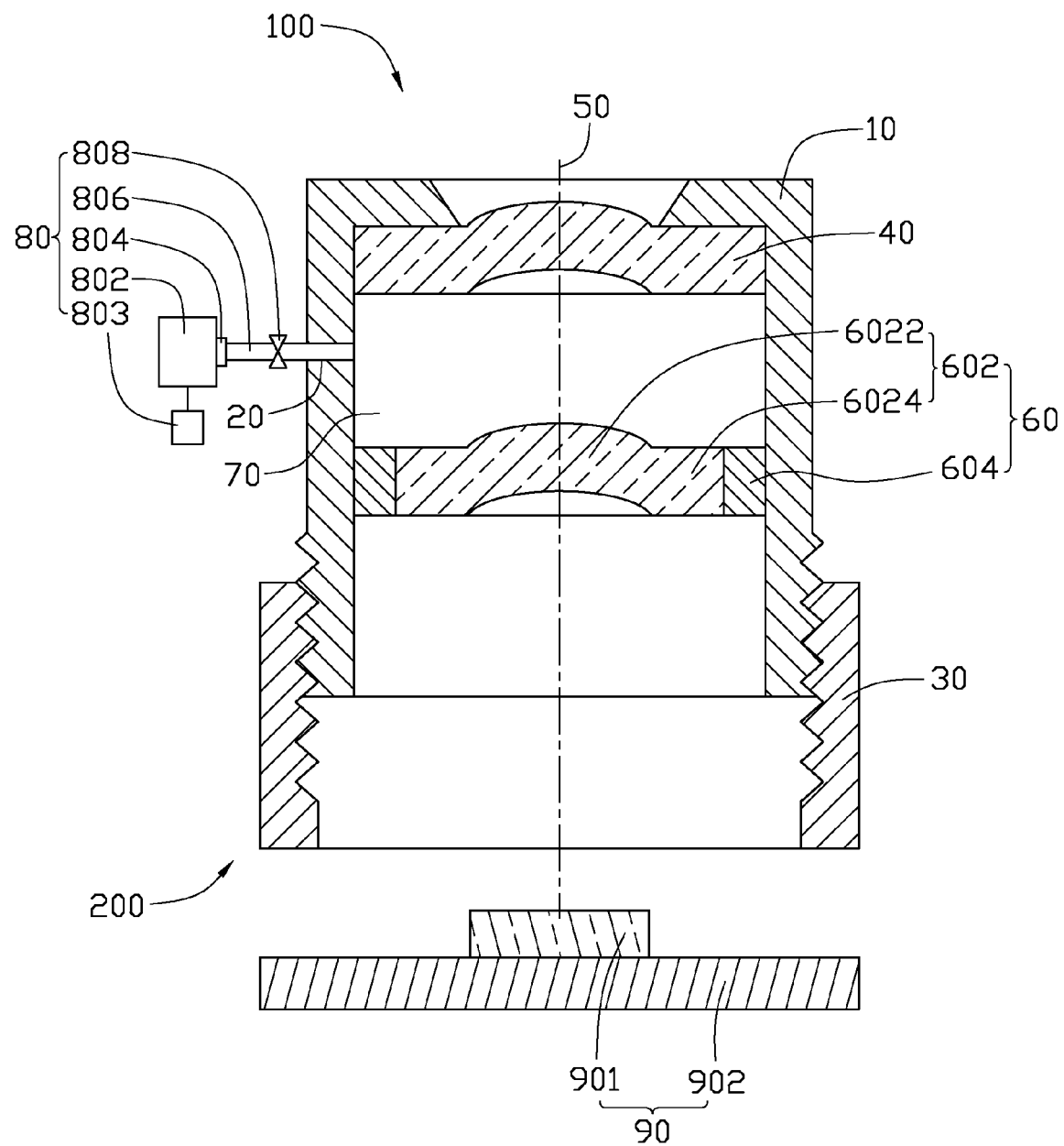
FIG. 1 is a schematic, partly exploded, side cross-sectional view of a camera module according to an exemplary embodiment of the present invention, the camera module including a lens module and an image sensor assembly, and the lens module including a first lens and a second lens.
Figure 2:
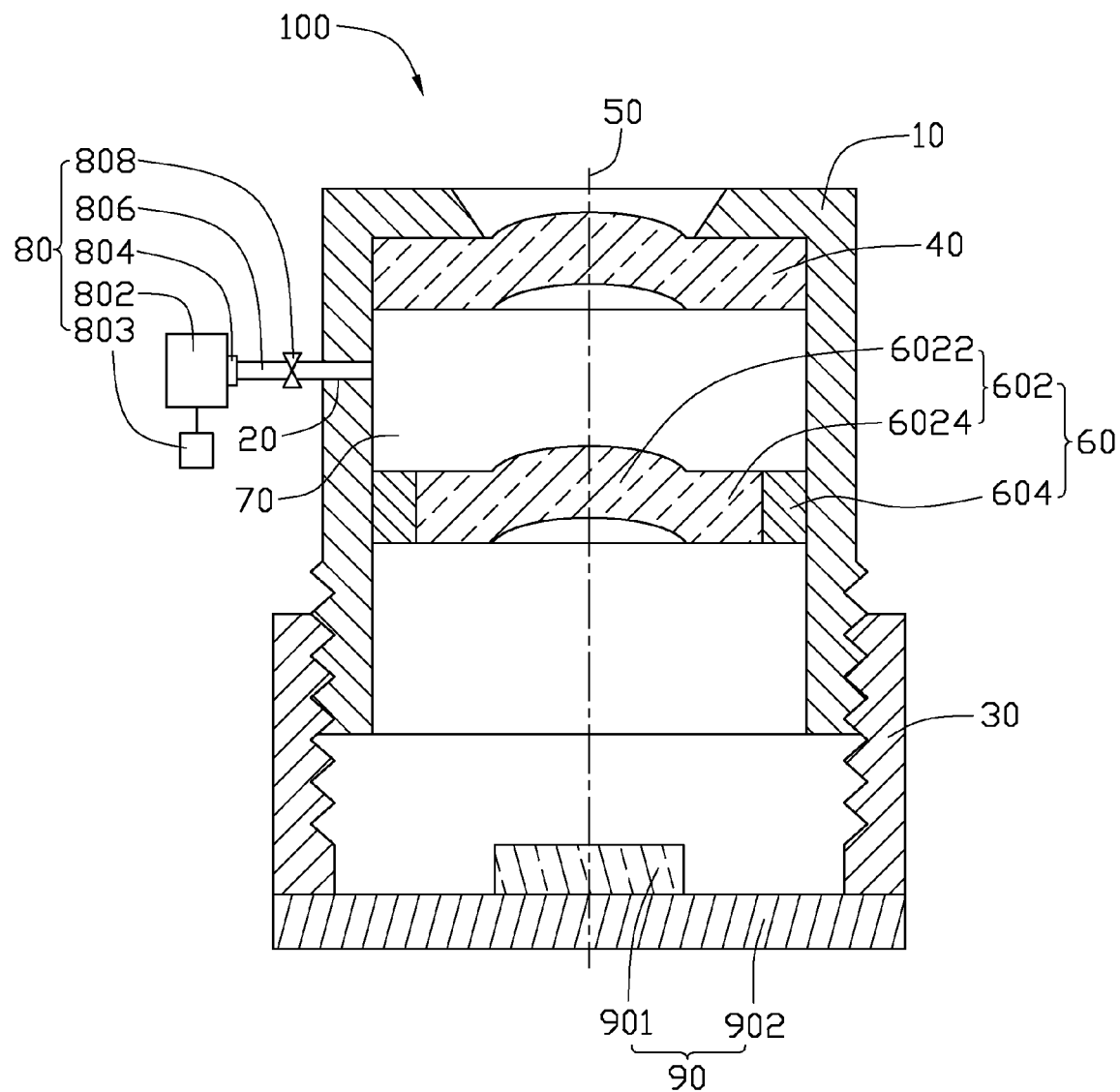
FIG. 2 is similar to FIG. 1, but showing the camera module fully assembled.
Figure 3:
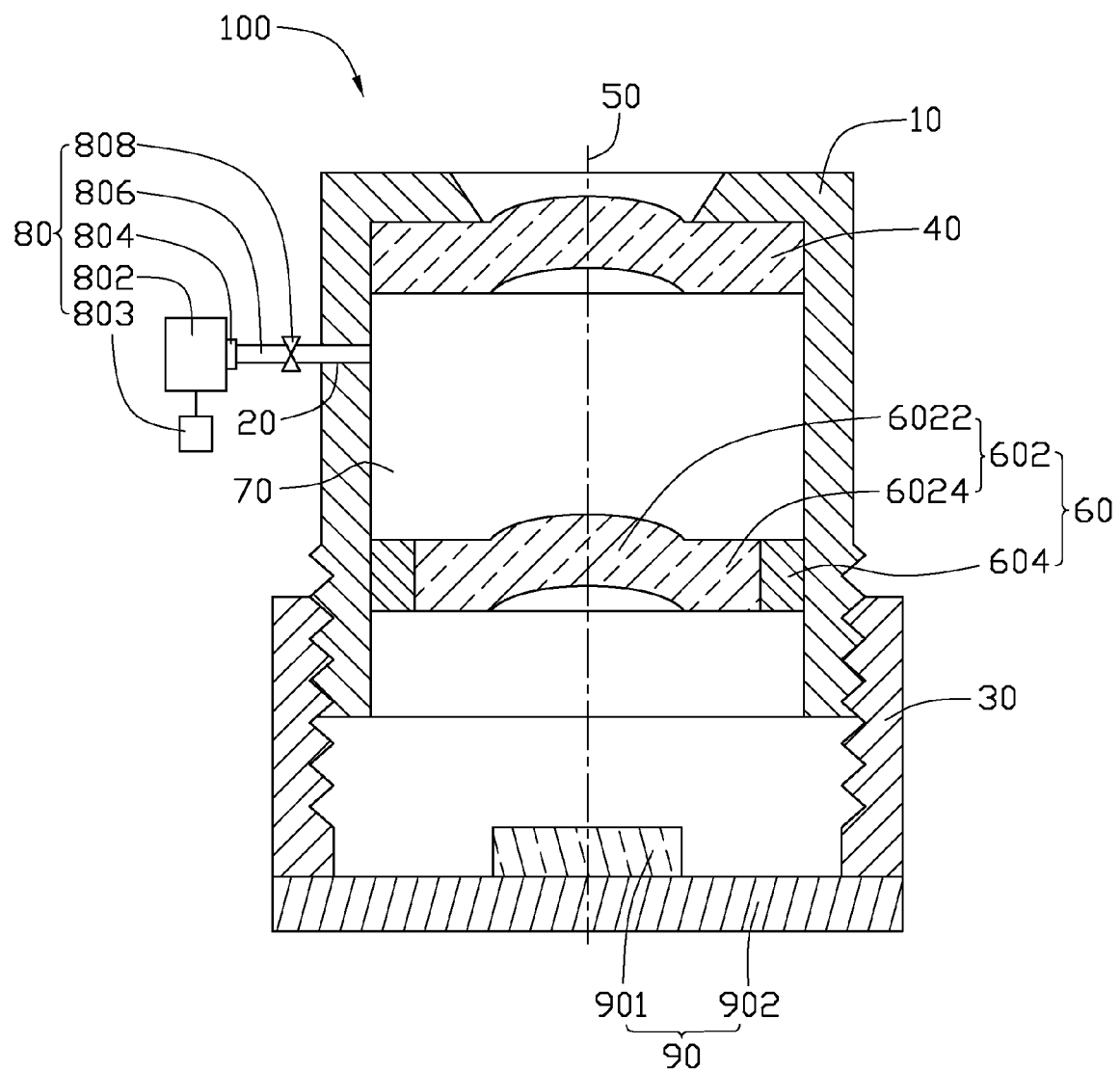
FIG. 3 is similar to FIG. 2, but showing the camera module in a first state in which the second lens is farther away from the first lens.
Figure 4:
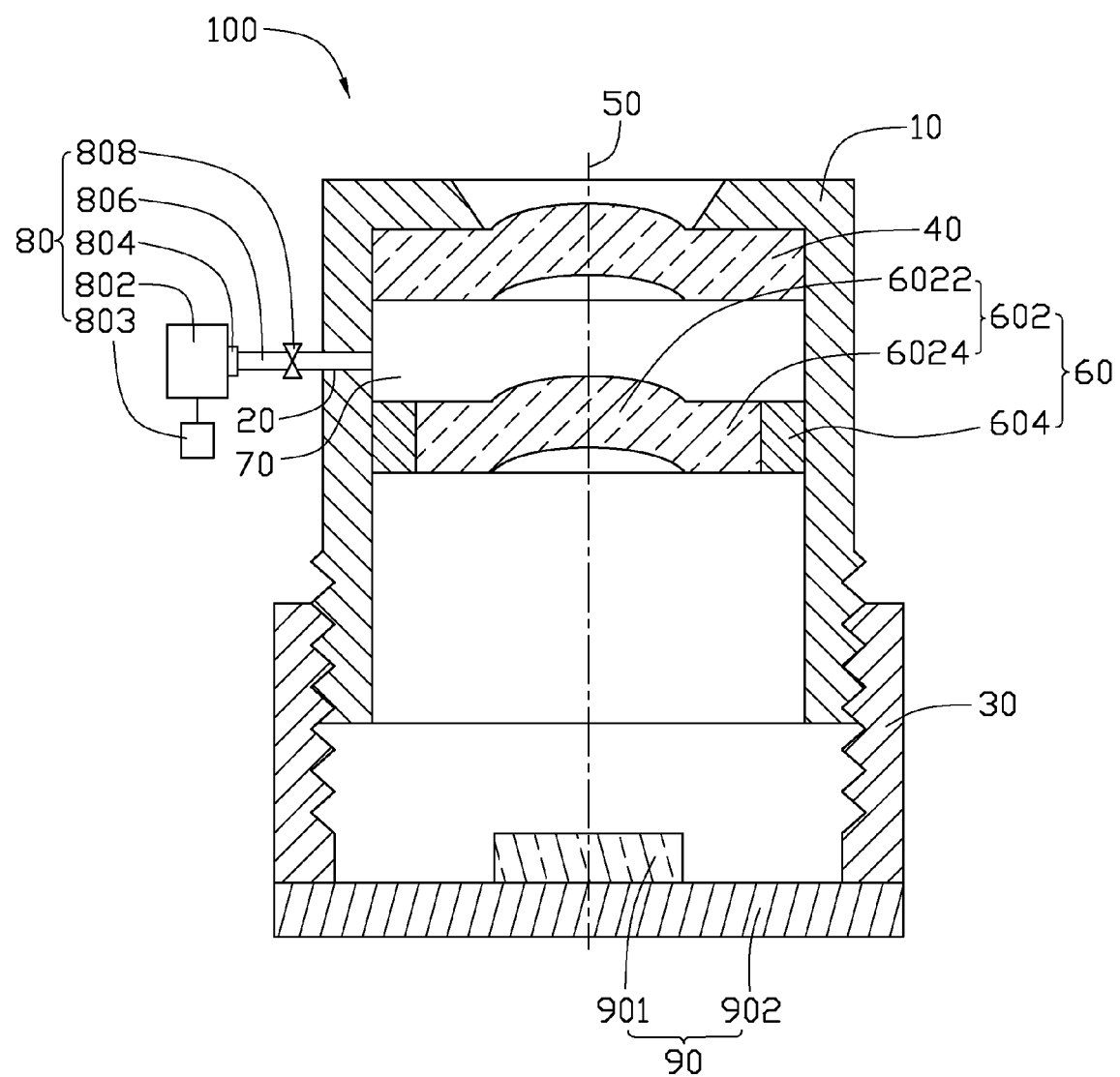
FIG. 4 is similar to FIG. 2, but showing the camera module in a second state in which the second lens is closer to the first lens.

Referring to FIGS. 1-4, a camera module 100 includes a barrel 10, a first lens 40 received in the barrel 10 and fixed thereto, a second lens 60 movably received in the barrel 10, a pressure control device 80, a holder 30, and an image sensor assembly 90. The barrel 10, the holder 30, the first lens 40, the second lens 60, and the pressure control device 80 cooperatively constitute a lens module 200.

The barrel 10 is threadedly coupled to the holder 30. The first lens 40, the second lens 60, and the barrel 10 cooperatively define a chamber 70. A hole 20 is defined in the peripheral side wall of the barrel 10. The hole 20 communicates with the chamber 70.

In the present embodiment, the first lens 40 is adhered to the barrel 10. The second lens 60 includes a main body 602, and an elastic portion 604 surrounding the main body 602. The main body 602 includes a central optical portion 6022 and a peripheral supporting portion 6024 surrounding the optical portion 6022. The elastic portion 604 closely contacts but is movable relative to an inner wall of the barrel 10. In the present embodiment, the elastic portion 604 can be attached to the main body 602 by adhesive, etc. The elastic portion 604 can for example be made of neoprene, caoutchouc, silicone rubber or polydimethyl siloxane (PDMS). The outer diameter of the second lens 60 matches the inner diameter of the barrel 10, so that the second lens 60 closely contacts the barrel 10 including when the second lens 60 moves back and forth along an optical axis 50 of the barrel 10.

The image sensor assembly 90 is mounted at an end of the holder 30, and includes an image sensor 901 and a printed circuit board 902. The printed circuit board 902 is mounted on an end face of the holder 30, with the image sensor 901 being received in the holder 30. The image sensor 901 is for example a charge coupled device (CCD) sensor or a complementary metal oxide semiconductor transistor (CMOS) sensor.

The pressure control device 80 communicates with the hole 20 for adjusting the gas pressure of the chamber 70. Accordingly, the pressure control device 80 can control a pressure difference between the chamber 70 at one side of the second lens 60 and an internal space (not labeled) of the camera module 100 at an opposite side of the second lens 60. Due to the pressure difference, the second lens 60 moves relative to the first lens 40 along the optical axis 50. The pressure control device 80 includes a pump 802 and a connection pipe 806. The pump 802 includes a gas output end 804. The connection pipe 806 connects the gas output end 804 with the hole 20. In one embodiment, the connection pipe 806 extends through the hole 20 and communicates with the chamber 70. The pressure control device 80 further includes a valve 808 in the connection pipe 806. The valve 808 is configured for regulating a flow of the gas through the connection pipe 806. In the present embodiment, the gas is air.

In operation, the valve 808 is opened and gas pumped out from the pump 802 enters the chamber 70, thus the gas pressure in the chamber 70 increases. With the increasing gas pressure in the chamber 70, the second lens 60 moves away from the first lens 40 along the optical axis 50 due to the pressure difference at the opposite sides of the second lens 60. Then the valve 808 is closed and the second lens 60 stops at a first equilibrium position where the second lens 60 is farther away from the first lens 40 compared to the original position of the second lens 60 (see FIG. 3).

Likewise, when the gas is pumped out from the chamber 70, the gas pressure in the chamber 70 decreases. With the decreasing gas pressure in the chamber 70, the second lens 60 moves towards the first lens 40 along the optical axis 50 due to the pressure difference at the opposite sides of the second lens 60. Then the valve 808 is closed and the second lens 60 stops at a second equilibrium position where the second lens 60 is closer to the first lens 40 compared to the original position of the second lens 60 (see FIG. 4).

In the above-described embodiments, the pressure control device 80 can further include a flux control unit 803 to precisely control the quantity of gas input to or extracted from the chamber 70, and thereby precisely control the movement of the second lens 60.

No gear assembly or stepper motor is required for adjusting the position of the second lens 60. Thus, the camera module 100 can be compact, lightweight, and easy to make.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope and spirit of the appended claims.

The invention claimed is:

1. A lens module comprising:
 a barrel comprising a peripheral side wall, the peripheral side wall having a hole defined therein;
 a first lens fixed to the barrel;
 a second lens movably received in the barrel, the second lens comprising a main body and an elastic portion surrounding the main body, the elastic portion closely contacting the barrel, with the first lens, the second lens, and the barrel cooperatively defining a chamber, the chamber communicating with the hole; and
 a pressure control device communicating with the hole, the pressure control device being configured for adjusting a gas pressure of the chamber and thereby creating a pressure difference between the gas in the chamber and a space at an opposite side of the second lens, such that the second lens is driven along an optical axis direction of the barrel.

2. The lens module of claim 1, wherein the pressure control device comprises a pump and a connection pipe, the pump comprises a gas output end, and the connection pipe connects the gas output end with the hole.

3. The lens module of claim 2, wherein the pressure control device further comprises a valve in the connection pipe, and the valve is configured for regulating a flow of the gas through the connection pipe.

4. The lens module of claim 1, wherein the pressure control device further include a flux control unit to precisely control the quantity of gas input to or extracted from the chamber.

5. The lens module of claim 1, wherein the gas is air.

6. The lens module of claim 1, wherein the elastic portion is comprised of material selected from the group consisting of neoprene, caoutchouc, silicone rubber and polydimethyl siloxane.

7. The lens module of claim 1, wherein the elastic portion is attached to the main body by adhesive.

8. A camera module comprising:
 a holder;
 an image sensor accommodated in the holder;
 a barrel comprising a peripheral side wall, the peripheral side wall having a hole defined therein;
 a first lens fixed to the barrel;
 a second lens movably received in the barrel, the second lens comprising a main body and an elastic portion surrounding the main body, the elastic portion closely contacting the barrel, with the first lens, the second lens, and the barrel cooperatively defining a chamber, the chamber communicating with the hole; and
 a pressure control device communicating with the hole, the pressure control device being configured for adjusting a gas pressure of the chamber and thereby creating a pressure difference between the gas in the chamber and a space at an opposite side of the second lens, such that the second lens moves along an optical axis of the barrel.

9. The camera module of claim 8, wherein the pressure control device comprises a pump and a connection pipe, the pump comprises a gas output end, the connection pipe connects the gas output end with the hole.

10. The camera module of claim 9, wherein the pressure control device further comprises a valve in the connection pipe, and the valve is configured for regulating a flow of the gas through the connection pipe.

11. The camera module of claim 8, wherein the gas is air.

12. The camera module of claim 8, wherein the elastic portion is comprised of material selected from the group consisting of neoprene, caoutchouc, silicone rubber and polydimethyl siloxane.

13. The camera module of claim 8, wherein the elastic portion is attached to the main body by adhesive.

14. A lens module comprising:
 a barrel comprising a peripheral side wall, the peripheral side wall having a hole defined therein;
 a first lens fixed to the barrel;
 a second lens movably received in the barrel, the second lens comprising a main body and a peripheral elastic portion around the main body, the elastic portion hermetically but movably contacting the peripheral side wall of the barrel, with the first lens, the second lens, and the barrel cooperatively defining a hermetical chamber, the chamber communicating with the hole; and
 a pressure control device communicating with the hole, the pressure control device being configured for adjusting a gas pressure of the chamber and thereby creating a pressure difference between the gas in the chamber and a space at an opposite side of the second lens, such that the second lens is driven along an optical axis direction of the barrel.

* * * * *